United States Patent [19]

Mayr et al.

[11] Patent Number: 4,802,336
[45] Date of Patent: Feb. 7, 1989

[54] HYDROSTATIC TRANSMISSION HAVING A CONTROL AND REGULATING DEVICE FOR ADJUSTING THE DRIVING TORQUE WITH SUPERIMPOSED OUTPUT POWER LIMIT REGULATION

[75] Inventors: Albert Mayr, Senden; Wolfgang Wiest, Tiefenbach, both of Fed. Rep. of Germany

[73] Assignee: Hydromatik GmbH, Uim/Donau, Fed. Rep. of Germany

[21] Appl. No.: 319,467

[22] Filed: Nov. 9, 1981

[30] Foreign Application Priority Data

Nov. 13, 1980 [DE] Fed. Rep. of Germany ....... 3042837

[51] Int. Cl.$^4$ ............................................ F10H 39/46
[52] U.S. Cl. ...................................... 60/448; 60/452; 60/443
[58] Field of Search ................. 60/444, 448, 465, 487, 60/381, 452, 328, 443, 445, 488

[56] References Cited

U.S. PATENT DOCUMENTS

| | | | |
|---|---|---|---|
| 3,236,049 | 2/1966 | Reinke | 60/444 |
| 3,555,817 | 1/1971 | Hann | 60/444 |
| 3,585,797 | 6/1971 | Moon, Jr. | 60/444 |
| 4,158,290 | 6/1979 | Cornell | 60/448 |
| 4,188,789 | 2/1980 | Hamma | 60/444 |
| 4,236,595 | 12/1980 | Beck et al. | 60/448 |
| 4,355,506 | 10/1982 | Leonard | 60/452 |
| 4,368,798 | 1/1983 | Meyerle et al. | 60/444 |

Primary Examiner—Deborah L. Kyle
Assistant Examiner—Richard L. Klein

Attorney, Agent, or Firm—Scully, Scott, Murphy & Presser

[57] ABSTRACT

There is disclosed an hydrostatic transmission having a control and regulating device for adjusting the driving torque with superimposed output power limit regulation, the transmission comprising a drive unit comprising an hydraulic pump having a variable output, and an hydraulic motor arranged to be operated by the hydraulic pump; a servo-adjusting device arranged to control the output of the hydraulic pump in order to adjust the working pressure in the transmission, said device comprising a servo piston arranged for two-way adjustment of the hydraulic pump in two directions, and a control valve arranged to subject the servo-piston to an adjusting pressure so that the piston can adjust the operation of the hydraulic pump; a servo-valve spool provided in said control valve and arranged, in dependence upon the desired direction of adjustment of the hydraulic pump, to be subjected on the one hand to a control pressure and on the other hand to the working pressure prevailing in the transmission or a regulating pressure proportional to the working pressure; an arbitrarily variable operating device comprising a pressure regulator for adjusting said control pressure from a constant supply pressure provided by an auxiliary pump; and a regulating valve arranged to limit the control pressure, or indirectly the supply pressure, and adjustable in dependence upon the amount of working fluid running through the drive unit whereby the regulating valve operates in dependence upon the discharge amount through the drive unit only when a predetermined minimal discharge amount is reached.

8 Claims, 3 Drawing Sheets

HYDROSTATIC TRANSMISSION HAVING A CONTROL AND REGULATING DEVICE FOR ADJUSTING THE DRIVING TORQUE WITH SUPERIMPOSED OUTPUT POWER LIMIT REGULATION

This invention relates to an hydrostatic transmission having a control and regulating device for adjusting the driving torque with superimposed output power limit regulation, the transmission comprising:

a drive unit comprising an hydraulic pump having a variable output, and an hydraulic motor arranged to be operated by the hydraulic pump;

a servo-adjusting device arranged to control the output of the hydraulic pump in order to adjust the working pressure in the transmission, said device comprising a servo-piston arranged for two-way adjustment of the hydraulic pump in two directions, and a control valve arranged to subject the servo-piston to an adjusting pressure so that the piston can adjust the operation of the hydraulic pump;

a servo-valve spool provided in said control valve and arranged, in dependence upon the desired direction of adjustment of the hydraulic pump, to be subjected on the one hand to a control pressure and on the other hand to the working pressure prevailing in the transmission or a regulating pressure proportional to the working pressure;

and an arbitrarily variable operating device comprising a pressure regulator for adjusting said control pressure from a constant supply pressure provided by an auxiliary pump.

In the case of numerous applications of hydrostatic drive units with a variably adjustable amount of circulating pressure fluid in the operating cycle, a high working pressure is required with a low rate of flow of liquid and yet a low output pressure is required with a high rate of flow of fluid. Since it would be uneconomical to provide a driving motor for the hydraulic pump of the drive unit of such great power that it could supply a large flow of liquid with a high working pressure, regulating devices are provided in order to guarantee that the discharge capacity of the hydraulic pump (speed of flow of the working pressure means in the drive unit) reduces if the working pressure in the drive cycle increases, with the result that the required driving force for the hydraulic pump never exceeds the available power from the driving motor. The regulating device therefore limits the possible driving torque for the hydrostatic drive unit for a certain driving speed at the hydraulic motor.

A regulating device of the above named type is known, for example for the pivot drive of an excavator from Z. "Oilhydraulic und Pneumatik" 23 (1979) no. 7, pages 514 to 518, particularly 518. Determining the speed of the drive motor is carried out by means of the discharge flow of the auxiliary pump. This known regulating device is therefore not suitable for a vehicular drive, since it is not effective in all operating conditions and in particular does not prevent excess speed of the drive motor in the event of load reversal on the drive unit.

The present invention has been developed primarily, though not exclusively, with a view to providing an hydrostatic transmission having a control and regulating device of the above type which is suitable for a vehicular drive in such a way that the power output regulation is fully effective for all imaginable operating conditions, therefore even for load reversal, when the masses subsequent to the hydraulic motor require to be decelerated.

According to the invention there is provided an hydrostatic transmission having a control and regulating device for adjusting the driving torque with superimposed output power limit regulation, said transmission comprising:

a drive unit comprising an hydraulic pump having a variable output, and an hydraulic motor arranged to be operated by the hydraulic pump;

a servo-adjusting device arranged to control the output of the hydraulic pump in order to adjust the working pressure in the transmission, said device comprising a servo-piston arranged for two-way adjustment of the hydraulic pump in two directions, and a control valve arranged to subject the servo-piston to an adjusting pressure so that the piston can adjust the operation of the hydraulic pump;

a servo-valve spool provided in said control valve and arranged, in dependence upon the desired direction of adjustment of the hydraulic pump, to be subjected on the one hand to a control pressure and on the other hand to the working pressure prevailing in the transmission or a regulating pressure proportional to the working pressure;

an arbitrarily variable operating device comprising a pressure regulator for adjusting said control pressure from a constant supply pressure provided by an auxiliary pump;

and a regulating valve arranged to limit the control pressure, or indirectly the supply pressure, and adjustable in dependence upon the amount of working fluid running through the drive unit whereby the regulating valve operates in dependence upon the discharge amount through the drive unit only when a predetermined minimal discharge amount is reached.

The control and regulating device, influenced by the respective drive speed on the hydraulic motor of the drive unit, is effective for both drive directions of the drive unit, that is for forward and reverse drive and for acceleration and deceleration. Deceleration is introduced by so-called checking at the transmission device. Even in the case of such a deceleration of the masses subsequent to i.e. downstream of the hydraulic motor, the power output limitation is immediately and completely effective, that is, in the event of pressure reversal in the operating cycle of the hydrostatic drive unit, but with the same direction of drive on the hydraulic motor, power output limitation is guaranteed by the hydrostatic transmission of the invention. Further, in the presence of a load, the power transmitted is determined not in dependence on the speed of the driving motor, but on the speed of the drive unit. Matching the drive motor for the hydraulic pump to the respectively required output can be carried out by changing the characteristic for the regulating valve itself or by changing the control characteristic for the regulating valve in dependence on the discharge capacity in the drive unit.

The following possibilities are given by the control and regulating device in a hydrostatic transmission according to the invention:

(a) Acceleration and deceleration is possible in the lower speed range (speed range of the drive unit) corresponding to the maximum driving torque laid down by the arrangement or to a torque value below this. Only maximum driving torques can be produced in the middle and higher speed range, which torques are permitted by the amount of the available power output of the driving motor.

(b) An effective braking of power output (e.g. when travelling downhill) is possible when the hydrostatic drive unit is used as a vehicular drive.

(c) Further reductions in control pressure can also be carried out during braking (checking process on the transmission device) by controlling the regulating valve in dependence upon the adjustment of the transmission device, and namely in such a way that a lower braking capacity is claimed than the existing drive power output (coordinating the possible braking capacity of the drive motor).

DESCRIPTION OF THE PREFERRED EMBODIMENT

Figure 1:
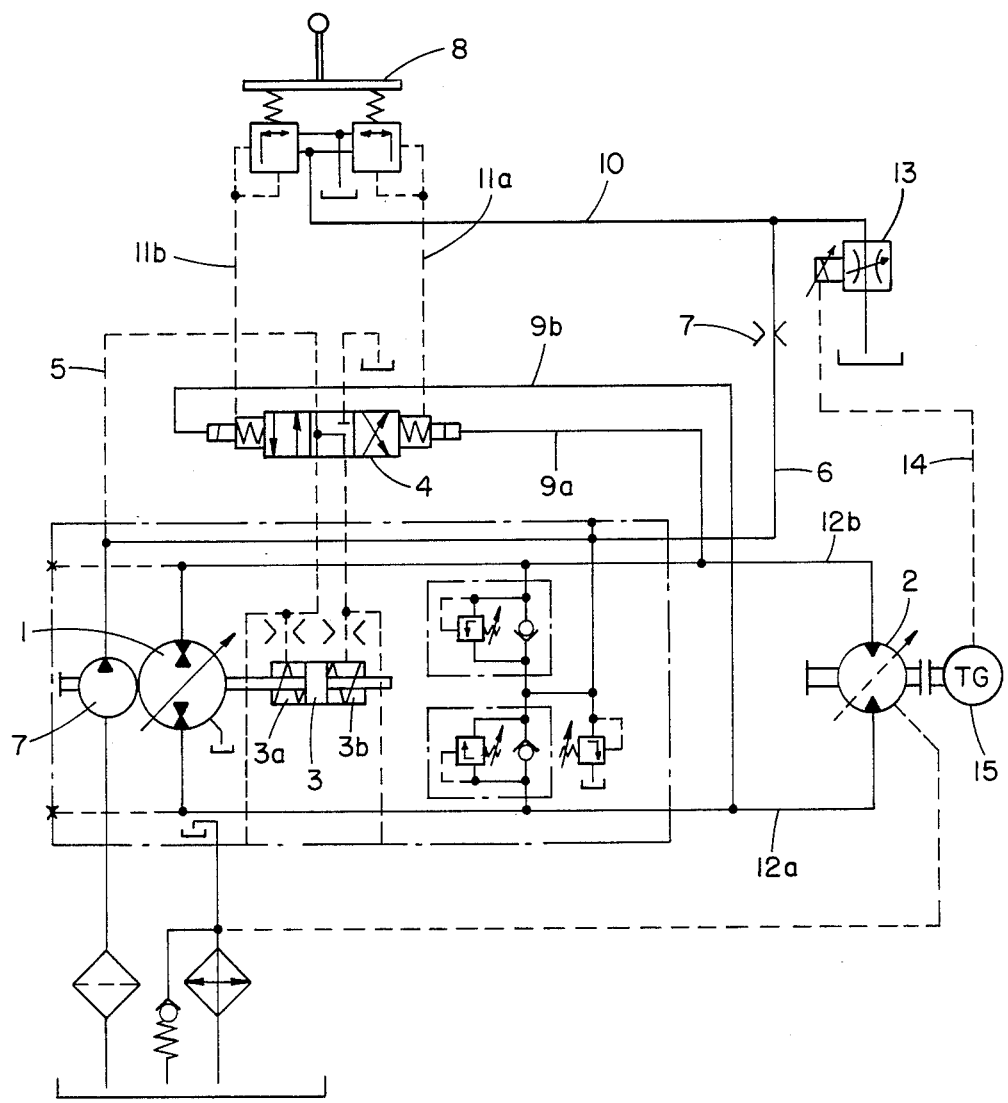
FIGS. 1, 2 and 3 are schematic illustrations of three similar embodiments of hydraulic circuit diagrams of a hydrostatic transmission pursuant to the present invention for use in a vehicular drive transmission, with FIG. 1 having an electrical system for controlling operation of the regulating valve therein, FIG. 2 having a mechanical system for controlling operation of the regulating valve therein, and FIG. 3 having a hydraulic system for controlling operation of the regulating valve therein.

Referring now to the drawings there is shown an hydrostatic transmission having a control and regulating device for adjusting the driving torque with superimposed output power limit regulation. The transmission comprises a drive unit comprising an hydraulic pump having a variable output, and an hydraulic motor and arrnged to be operated by the hydraulic pump. A servo-adjusting device is arranged to control the output of the hydraulic pump in order to adjust the working pressure in the transmission, the device comprising a servo-piston arranged for two-way adjustment of the hydraulic pump in two directions, and a control valve arranged to subject the servo-piston to an adjusting pressure so that the piston can adjust the operation of the hydraulic pump. A servo-valve spool is provided in the control valve and arranged, in dependence upon the desired direction of adjustment of the hydraulic pump, to be subjected on the one hand to a control pressure and on the other hand to the working pressure prevailing in the transmission or a regulating pressure proportional to the working pressure. An arbitrarily variable operating device, comprising a pressure regulator, is provided for adjusting the conrtrol pressure from a constant supply pressure provided by an auxiliary pump. A regulating valve is arranged to limit the control pressure, or indirectly the supply pressure, and is adjustable in dependence upon the amount of working fluid running through the drive unit whereby the regulating valve operates in dependence upon the discharge amount through the drive unit only when a predetermined minimal discharge amount is reached.

The hydrostatic drive unit is formed by an adjustable hydraulic pump 1 and a hydraulic motor 2, which are connected to each other by means of working pressure lines 12a and 12b in a closed operating cycle. The hydraulic pump 1 is driven by a driving motor (not shown), together with which the drive unit forms, for example, a vehicular drive with reduction of power output at the output shaft of the hydraulicmotor 2. As to which of the working lines 12a or 12b carries high pressure depends on the respective torque direction of the hydraulic motor 2. The discharge capacity of the hydraulic pump 1 is adjusted by means of a servo piston 3 in two directions. The piston chambers 3a and 3b of the servo piston 3 are, according in each case to the adjustment of the torque regulating valve 4, subjected to adjusting pressure by means of an adjusting line 5, whereby the adjusting pressure in the shown embodiment is branched by a pressure supply line 6, into which pressure supply means for the regulating device are conveyed by an auxiliary pump 7 of a constant capacity. The auxiliary pump 7 is driven by the driving motor (not shown) with the same speed as the hydraulic pump 1. A constant pressure supply is set, dependent on the adjustment of a pressure-limiting valve 16 upstream of a restrictor 7a in the supply line 6, which pressure is passed as a changeable control pressure into the control line 11a or 11b with the aid of an arbitrarily variable operating device in the form of a transmission device 8 which is arbitrarily adjustable by hand. The control pressure in the lines 11a, respectively 11b works on one side of the torque regulating valve 4 designed as a servo valve spool. The high pressure supplied via the lines 9a respectively 9b of the working cycle of the hydrostatic drive unit counteracts the control pressure of the line 11a, respectively 11b in each case, having effect on the other side of the servo valve spool. In this conventional circuit for torque regulation, the other known circuit elements, which are, however, insignificant as far as the invention is concerned, are not described in any detail.

For the power output regulation, which is to be superimposed on the torque regulation, for the hydrostatic drive unit, a regulating valve 13 is assigned to the pressure supply line 10, which is designed as a pressure limiting valve in the shown embodiment. This valve 13 is, in the illustrated embodiments controlled in dependence upon the driving speed of the hydraulic motor 2.

FIG. 1 illustrates an exemplary electrical control system in which the speed of the hydraulic motor 2 is measured by a tachogenerator 15, which transmits an electrical control signal over electrical line 14 to control the operation of the regulating valve 13.

Figure 2:
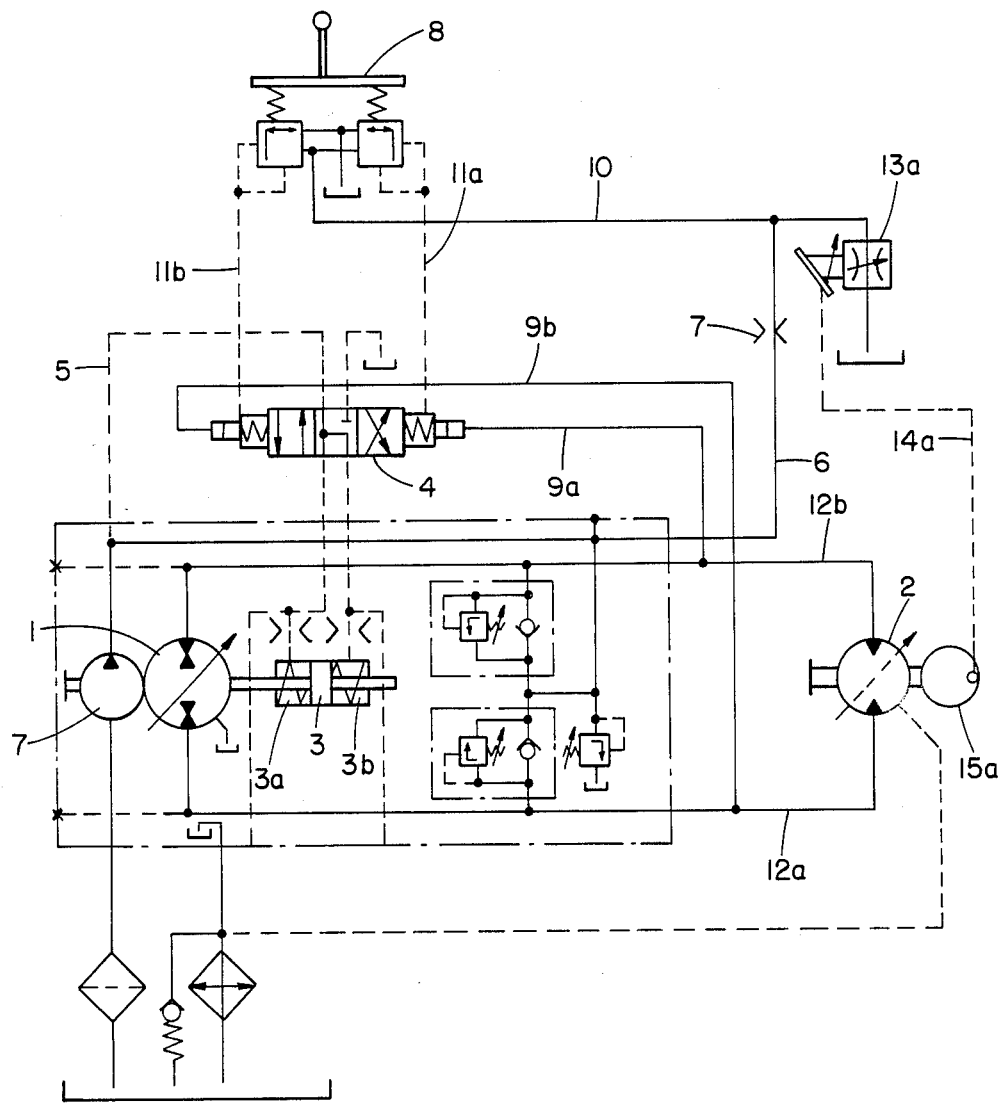

FIG. 2 illustrates an alternative exemplary mechanical control system in which the speed of the hydraulic motor 2 is measured by an appropriate mechanical transducer 15a, which senses the speed of hydraulic motor 2 and controls a mechanically actuated regulating valve 13a by movement of a mechanical linkage 14a.

Figure 3:
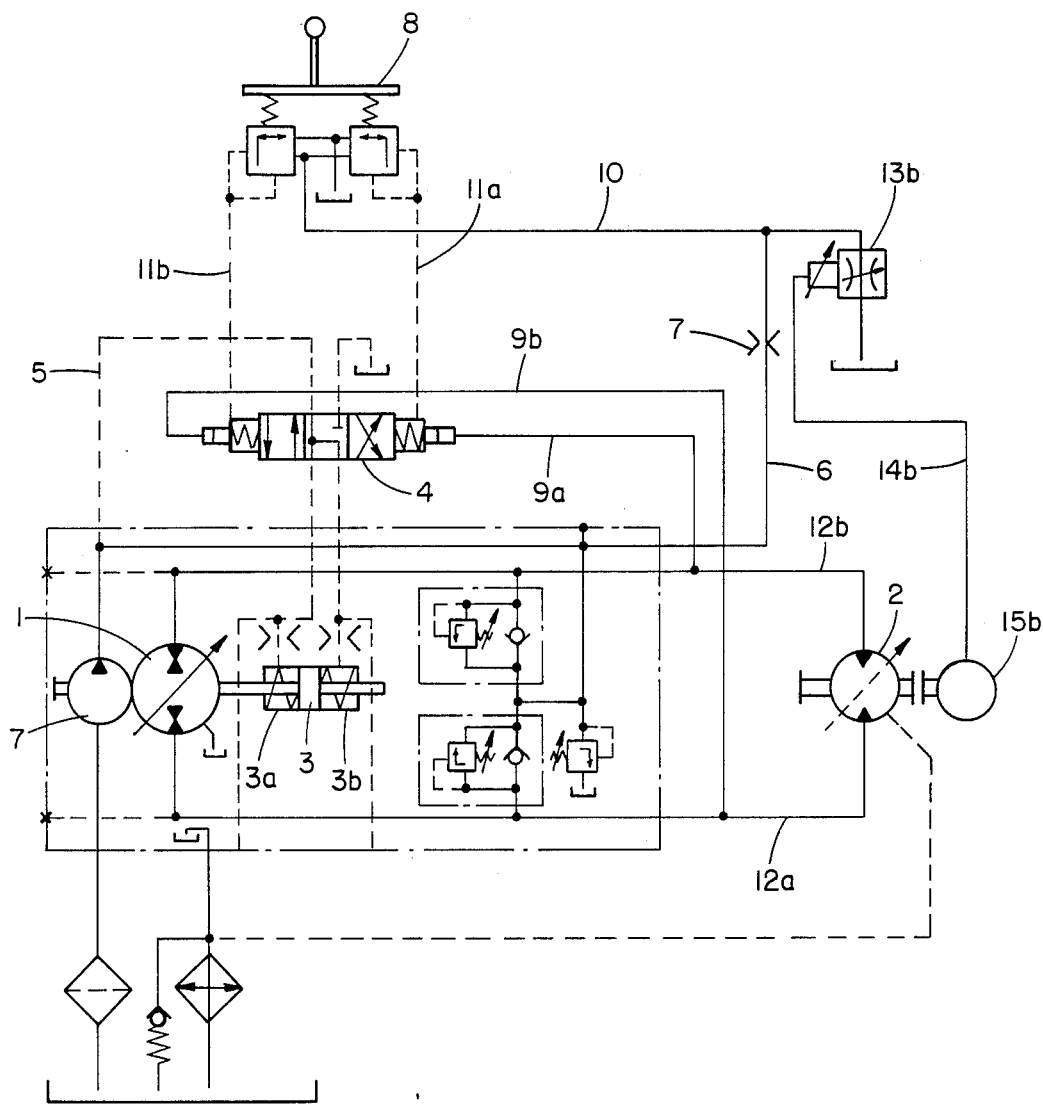

FIG. 3 illustrates an alternative exemplary hydraulic control system in which the speed of the hydraulic motor 2 is measured by an appropriate hydraulic transducer 15b, which senses the speed of the hydraulic motor 2 and controls a hydraulicly actuated regulating valve 13b over a hydraulic control line 14b. For example, a hydraulic speed-dependent control by means of shutters represents one possible embodiment of such a hydraulic control system.

The valve 13 can also be arranged in the supply line 10 as an adjustable choke. A design of the same function is produced if control valves controlled in dependence on the speed of the hydraulic motor 2 are arranged in the control pressure lines 11a and 11b.

A control connection is indicated in the drawing by 17, which connects the transmission device 8 to the valve 13. This control connection can be mechanical, electrical or hydraulic and corresponds advantageously in its design to the control connection 14, in order to permit parallel control of the valve 13 with the same control means. Control of the valve 13 by the transmission device 8 via the control connection 17 is effected in that a reduction in control pressure or respectively supply pressure by means of the valve 13 is possible for certain settings of the transmission device in dependence on the position of the transmission device. Such a definite setting of the transmission device can, for example, be the setting "brake" on the transmission device, so that a lower braking capacity can be set on the drive unit, but which can still be taken up by the respective driving motor, and which is lower than the predetermined driving power output of the drive unit.

The resumption of power output of the drive unit is a function of the working pressure in the drive cycle—predetermined via the transmission device 8 and the torque regulating valve 4 operating as a variable pressure regulator—and of the respective discharge capacity of the hydraulic pump 1. The supply pressure for the transmission device to adjust the control pressure is reduced via the regulating valve 13 in dependence on the driving speed of the drive unit (hydraulic motor 2) in such a way that for each discharge setting of the hydraulic pump 1, a maximum working pressure in the operating cycle of the drive unit produced from the required drive output of the unshown driving motor for the hydraulic pump 1 is not exceeded.

The control and regulating device according to the invention (torque regulation with superimposed power output limitation) can be designed for primary regulation of the working cycle of the hydrostatic drive unit, for secondary regulation or for combined primary and secondary regulation of the hydrostatic operating cycles. In the latter case, the respectively set control pressure is allotted suitably to the hydraulic pump and to the hydraulic motor. Moreover, parallel connection and control of several hydraulic pumps or hydraulic motors is possible. The described device in the case of a hydrostatic drive unit is applicable not only for vehicular drives, but also for all types of drive for accelerated and/or decelerated masses.

We claim:

1. A hydrostatic transmission having a control and regulating device for adjusting the driving torque with superimposed output power limit regulation, comprising:
   a drive unit comprising a hydraulic pump having a variable output, and a hydraulic motor arranged to be operated by the hydraulic pump;
   a servo-adjusting device arranged to control the output of the hydraulic pump in order to adjust the working pressure in the transmission, said device comprising a servo-piston arranged for two-way adjustment of the hydraulic pump in two directions, and a control valve arranged to subject the servo-piston to an adjusting pressure so that the piston can adjust the operation of the hydraulic pump;
   a servo-valve spool provided in said control valve and arranged, in dependence upon the desired direction of adjustment of the hydraulic pump, to be subjected on the one hand to a control pressure and on the other hand to the working pressure prevailing in the transmission or regulating pressure proportional to the working pressure;
   a variable operating device comprising a pressure regulator for adjusting said control pressure from a constant supply pressure provided by an auxiliary pump;
   and a regulating valve arranged to limit the control pressure, or indirectly the supply pressure for the variable operating device, and adjustable in dependence upon the amount of working fluid running through the drive unit whereby the regulating valve operates in dependence upon the discharge amount through the drive unit only when a predetermined minimal discharge amount is reached.

2. A hydrostatic transmission according to claim 1, including a speed measuring device arranged to determine the discharge amount in the drive unit by monitoring the speed of the hydraulic motor, said speed measuring device controlling the operation of said regulating valve.

3. A hydrostatic transmission according to claim 1, including a measuring device arranged to determine the discharge amount in the drive unit by monitoring the discharge amount of the hydraulic pump, said measuring device controlling the operation of said regulating valve.

4. A hydrostatic transmission according to claim 2, including means for mechanically, electrically or hydraulically controlling the operation of the regulating valve by the speed measuring device.

5. A hydrostatic transmission according to claim 3, including means for mechanically, electrically or hydraulically controlling the operation of the regulating valve by the measuring device.

6. A hydrostatic transmission according to claim 1, in which the regulating valve is an adjustable pressure-limiting valve connected in a line carrying the supply pressure or in lines carrying the control pressure.

7. A hydrostatic transmission according to claim 1, in which the regulating valve is an adjustable choke valve connected in a line carrying the supply pressure or in lines carrying the control pressure.

8. A hydrostatic transmission according to claim 1, in which the regulating valve is controllable in dependence upon the adjustment of said operating device.

* * * * *